(No Model.)

A. McCREARY.
MONUMENT.

No. 362,643. Patented May 10, 1887.

Witnesses:

Austin McCreary
by James W. See
Inventor

Attorney

UNITED STATES PATENT OFFICE.

AUSTIN McCREARY, OF MASON, OHIO.

MONUMENT.

SPECIFICATION forming part of Letters Patent No. 362,643, dated May 10, 1887.

Application filed September 27, 1886. Serial No. 214,585. (No model.)

*To all whom it may concern:*

Be it known that I, AUSTIN MCCREARY, of Mason, Warren county, Ohio, have invented certain new and useful Improvements in Monuments, of which the following is a specification.

This invention pertains to the construction of sepulchral and memorial monuments, and the improvements will be readily understood from the following description, taken in connection with the accompanying drawings, in which—

Figure 1:
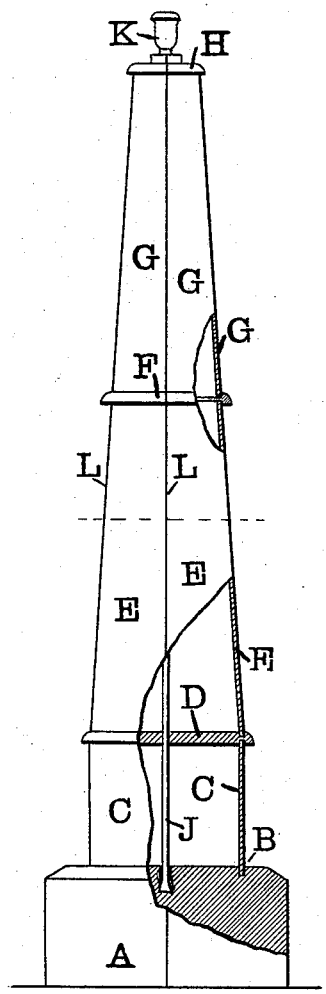
Figure 2:
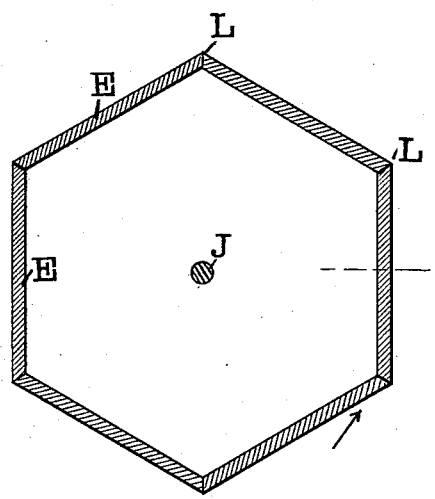

Figure 1 is an elevation of a monument illustrating my improved construction, certain portions being shown in vertical section; and Fig. 2, a horizontal transverse section of the same upon an enlarged scale.

In the drawings, A represents the base of the monument, the same being formed of stone or similar material, of a plan adapted for the proper reception and support of the superstructure; B, a groove in the upper surface thereof, such groove forming the plan lines of the dado; C, vertical slabs of glass seating in the groove and joined at their edges, so as to make up a box forming the dado of the monument; D, a plate grooved upon its under side and having its edge molding to form the surbase of the monument, the groove referred to engaging the upper ends of the slabs C, the surbase-plate being provided, also, with grooves in its upper surface similar to those below; E, slabs of glass disposed upright, with their lower ends in the upper groove of the surbase-plate, the vertical edges of the slabs being joined to form the hollow subshaft of the monument; F, a plate similar to plate D, engaging the upper ends of the slabs E and provided upon its upper surface with a groove for the reception of slabs; G, slabs similar to the slabs E, but disposed above the plate F and forming the supershaft of the monument; H, a cap-plate grooved upon its lower side like the plates F and D, and engaging the upper edges of the slabs G; J, a rod, preferably of brass, leaded or otherwise secured in the base and extending axially upward through the entire column; K, a nut of ornamental design screwed upon the upper end of this rod, and L vertical edge joints between the slabs, these joints being formed in radial lines.

The plates D, F, and H are to be formed, preferably, of metal of non-corrosive character—such, for instance, as brass or bronze—and the nut K should be of similar material. The slabs of which the main portions of the monument are formed are to be of glass varying in thickness from a quarter of an inch to an inch, according to the size of the monument, and their outer faces are to be highly polished, while their inner faces are to bear any desired character of ornamentation or inscriptive matter done by painting, enameling, or by cutting, or by etching, or by means of a sand-blast. All the edge joints of the plates should be accurately fitted. The rod, with its nut, serves to clamp all of the parts together to form a very substantial integral structure, water-proof, and of great beauty, strength, and durability.

The illustration shows the monument as hexagonal; but obviously the plan may be varied as desired.

The joints L are in planes radiating from the center of the structure. These joint-surfaces are readily produced by well-known processes of glass cutting and grinding, and their form permits the ready assembling of the slabs into the structure, no strains or warping in the slabs themselves having any effect upon the perfection of these edge joints. These joints add to the beauty of the monument by producing lines of translucency when viewed at an angle to the plane of the joints, as indicated by the arrow in Fig. 2. The joints thus formed possess a yielding quality, as the surfaces may readily move upon each other in case of flexure of the monument, or in case during the erection the nut K is made too tight, thus causing an outward bowing of the plates. Such outward bowing, while a defect which should be at once remedied, will not produce fracture of the edge joints. The introduction of the plate F serves in permitting a high shaft to be built from comparatively short slabs, and at the same time avoids the tendency to outward swelling which would inhere in exceedingly long slabs of glass.

The employment of the plate F, by dividing the vertical height of the slabs forming the shaft, permits of thicker slabs being used in the subshaft, and permits of ready replacement of a single piece which may happen to be damaged.

Monuments have been formed of glass slabs with their edges seated in grooves in corner-posts, and also of glass cylinders having no vertical joints, and various sections of monuments have been secured together by a central rod, and the ends of the slabs of which monuments have been formed have been seated in grooved or rabbeted caps and bases, and the base of a monument has been formed of slabs bearing a cap at their upper end, the cap being surmounted by a shaft. I disclaim such features as of my invention.

I claim as my invention—

1. In a monument, a base and cap provided with slab-receiving grooves, a central rod and nut engaging the base and cap, and vertical slabs of glass engaging said grooves and having their edge joints formed in radial planes, combined and arranged substantially as set forth.

2. In a monument, a base and cap provided with slab-receiving grooves, a central rod and nut engaging the base and cap, a plate, F, disposed between the base and cap, and provided upon its upper and lower surfaces with slab-receiving grooves, and a shaft formed in two sections adjoining each other at said plate F and engaging the grooves of the base and cap, such shaft being formed of slabs having their edge joints formed in radial planes, combined and arranged substantially as set forth.

AUSTIN McCREARY.

Witnesses:
J. W. SEE,
W. A. SEWARD.